US012437521B2

(12) United States Patent
Ou et al.

(10) Patent No.: US 12,437,521 B2
(45) Date of Patent: Oct. 7, 2025

(54) FEW-SHOT OBJECT DETECTION METHOD (71) Applicant: BEIJING UNIVERSITY OF POSTS & TELECOMMUNICATIONS, Beijing (CN)

(72) Inventors: Zhonghong Ou, Beijing (CN); Junwei Yang, Beijing (CN); Xiaoyang Kang, Beijing (CN); Jiawei Fan, Beijing (CN); Xie Yu, Beijing (CN); Meina Song, Beijing (CN)

(73) Assignee: BEIJING UNIVERSITY OF POSTS & TELECOMMUNICATIONS, Beijing (CN)

( * ) Notice: Subject to any disclaimer, the term of this patent is extended or adjusted under 35 U.S.C. 154(b) by 17 days.

(21) Appl. No.: 18/551,919

(22) PCT Filed: Sep. 8, 2022

(86) PCT No.: PCT/CN2022/117896
§ 371 (c)(1),
(2) Date: Sep. 22, 2023

(87) PCT Pub. No.: WO2023/109208
PCT Pub. Date: Jun. 22, 2023

(65) Prior Publication Data
US 2024/0177462 A1 May 30, 2024

(30) Foreign Application Priority Data
Dec. 15, 2021 (CN) .......................... 202111535847.6

(51) Int. Cl.
*G06V 10/774* (2022.01)
*G06V 10/26* (2022.01)
(Continued)

(52) U.S. Cl.
CPC .......... *G06V 10/7753* (2022.01); *G06V 10/26* (2022.01); *G06V 10/764* (2022.01); *G06V 10/7715* (2022.01); *G06V 10/82* (2022.01)

(58) Field of Classification Search
CPC .......... G06V 10/7753; G06V 10/7715; G06V 10/82; G06V 10/26; G06V 10/764
See application file for complete search history.

(56) References Cited

U.S. PATENT DOCUMENTS 10,832,096 B2 * 11/2020 Karlinsky ............... G06F 18/22
2020/0097771 A1 * 3/2020 Min ..................... G06V 10/462
(Continued)

OTHER PUBLICATIONS

Fan, Qi, et al. "Few-shot object detection with attention-RPN and multi-relation detector." Proceedings of the IEEE/CVF conference on computer vision and pattern recognition. 2020. (Year: 2020).*

(Continued)

*Primary Examiner* — Utpal D Shah
(74) *Attorney, Agent, or Firm* — Hodgson Russ LLP (57) ABSTRACT

A few-shot object detection method includes: sending a weight of a backbone network and a weight of a feature pyramid to a detection network; generating candidate regions, in which the candidate regions derived from a result of foreground-and-background classification and regression of output features of the visual representation backbone network by a region proposal network; generating candidate region features of a uniform size using a pooling operator based on the candidate regions, and performing location regression, content classification and fine-grained feature mining on the candidate region features of the uniform size; establishing fine-grained positive sample pairs and negative sample pairs through the fine-grained feature mining, and performing comparative learning between fine-grained features of the candidate regions; and generating a loss function (Continued)

according to a strategy in fine-grained feature mining, and updating detection network parameters by calculating based on the loss function.

18 Claims, 3 Drawing Sheets

(51) Int. Cl.
*G06V 10/764* (2022.01)
*G06V 10/77* (2022.01)
*G06V 10/82* (2022.01)

(56) References Cited

U.S. PATENT DOCUMENTS

| | | | |
|---|---|---|---|
| 2020/0160124 A1* | 5/2020 | Fu | G06V 10/764 |
| 2022/0101628 A1* | 3/2022 | Sun | G06V 10/25 |
| 2022/0156593 A1* | 5/2022 | Liu | G06F 18/2155 |
| 2022/0375213 A1* | 11/2022 | Xu | G06V 10/28 |
| 2023/0129263 A1* | 4/2023 | Byun | G06V 10/82 |
| | | | 382/103 |
| 2024/0404235 A1* | 12/2024 | Lilaonitkul | G06V 10/25 |

OTHER PUBLICATIONS

Sun, Xin, et al. "Few-shot learning for domain-specific fine-grained image classification." IEEE Transactions on Industrial Electronics 68.4 (2020): 3588-3598. (Year: 2020).*

WIPO, International Search Report for PCT/CN2022/117896, Nov. 29, 2022.

* cited by examiner

FIG. 3 candidate region   sliding window   fine-grained feature mining

FEW-SHOT OBJECT DETECTION METHOD

CROSS REFERENCE TO RELATED APPLICATIONS

This application is a U.S. national phase entry of International Application No. PCT/CN2022/117896, filed on Sep. 8, 2022, which claims priority to Chinese patent application No. 202111535847.6, filed on Dec. 15, 2021, the entire disclosure of which are incorporated herein by reference.

TECHNICAL FIELD

The disclosure relates to the field of deep learning, in particular to a few-shot object detection method, and a few-shot object detection apparatus.

BACKGROUND

In recent years, the development of Deep Convolutional Neural Networks (DCNs) has greatly contributed to the advancement of algorithms in the field of computer vision. As one of the research branches in the field of computer vision, a main task of object detection is to classify and locate objects in images. General object detection is mainly divided into two branches: a two-phase detection network and a single-stage detection network.

SUMMARY

A first aspect of the embodiments of the disclosure provides a few-shot object detection method. The method includes:
  sending a weight of a backbone network and a weight of a feature pyramid to a detection network, in which the weight of the backbone network and the weight of the feature pyramid are derived from a visual representation backbone network generated by self-supervised training;
  generating candidate regions, in which the candidate regions are derived from a result of foreground-and-background view classification and regression of output features of the visual representation backbone network by a region proposal network;
  generating candidate region features of a uniform size using a pooling operator based on the candidate regions, and performing location regression, content classification and fine-grained feature mining on the candidate region features of the uniform size;
  establishing fine-grained positive sample pairs and negative sample pairs through the fine-grained feature mining, and performing comparative learning between fine-grained features of the candidate regions, in which the fine-grained feature mining includes a strategy of: performing region division on the uniform-sized candidate region features using an even division manner, extracting features of different regions after the division, assigning same labels to region division results from a same candidate region and assigning different labels to region division results from different candidate regions; and
  generating a loss function according to the strategy in the fine-grained feature mining, and updating detection network parameters by calculating based on the loss function.

A second aspect of the embodiments of the disclosure provides a computer device. The computer device includes: a memory, a processor and computer programs stored on the memory and executable on the processor. When the computer programs are executed by the processor, the few-shot object detection method described according to the first aspect of the embodiments of the disclosure is implemented.

A third aspect of the embodiments of the disclosure provides a non-transitory computer-readable storage medium having computer programs stored thereon. When the computer programs are executed by a processor, the few-shot object detection method described according to the first aspect of the embodiments of the disclosure is implemented.

Additional aspects and advantages of embodiments of disclosure will be given in part in the following descriptions, become apparent in part from the following descriptions, or be learned from the practice of the embodiments of the disclosure.

BRIEF DESCRIPTION OF THE DRAWINGS

The foregoing and/or additional aspects and advantages of the disclosure will become apparent and readily understood from the following description of the embodiments in combination with the accompanying drawings, in which.

DETAILED DESCRIPTION

Embodiments of the disclosure are described in detail below, and examples of the embodiments are shown in the accompanying drawings, in which the same or similar numbers indicate the same or similar components or components having the same or similar functions. The embodiments described below with reference to the accompanying drawings are exemplary, and are intended to be used to explain the disclosure and are not to be construed as limiting the disclosure.

In the related art, few-shot learning starts to receive increasing attention from academia and industry. The few-shot learning aims to mine potential features of samples through a small amount of labeled data, and then fit a robust feature space based on a small amount of data to accomplish relevant visual perception tasks. As one of the important branches in the field of new-shot learning, few-shot object detection aims to classify and locate corresponding objects by using a small amount of labeled data from a novel class. Currently, there are following two main solutions for the new-shot object detection.

Few-shot object detection based on meta learning aims to cause a model to learn "how to learn", and can be divided into an optimization-based method and a metric-based method. The optimization-based method aims at constructing an effective parameter update law or constructing a good parameter initialization law. The metric-based method focuses on how to construct a robust feature embedding space and generate representations of different classes in the embedding space by similarity calculation.

Few-shot object detection based on transfer learning performs sufficient training on a base class with rich samples, and fine-tunes the model with a small amount of data from a novel class, to achieve better generalization performance on novel classes with minimal loss of base class knowledge.

However, the few-shot object detection based on meta learning introduces additional model parameters during training, which increases the spatial complexity of the model and also tends to lead to overfitting problems, thereby difficult to produce good network initialization laws. In addition, the few-shot object detection based on transfer learning transfers the knowledge learned from the base class to a novel class by fine-tuning. Due to the small amount of data in the novel class, the model does not pay enough attention to the spatial information and is prone to misclassification in the object classification module, resulting in low detection accuracy. Therefore, a few-shot object detection method with higher generalization performance is needed.

Therefore, the disclosure provides a few-shot object detection method, for constructing a robust visual representation backbone network by using self-supervised learning instead of large datasets and designing self-supervised tasks, to provide a good parameter initialization direction for the few-shot object detection. Moreover, based on inter-sample and intra-sample spatial attention mechanisms, the essential features of data are mined, to improve the performance of the model on few-shot dataset.

A few-shot object detection method, and a few-shot object detection apparatus are described below with reference to the accompanying drawings.

Figure 1:
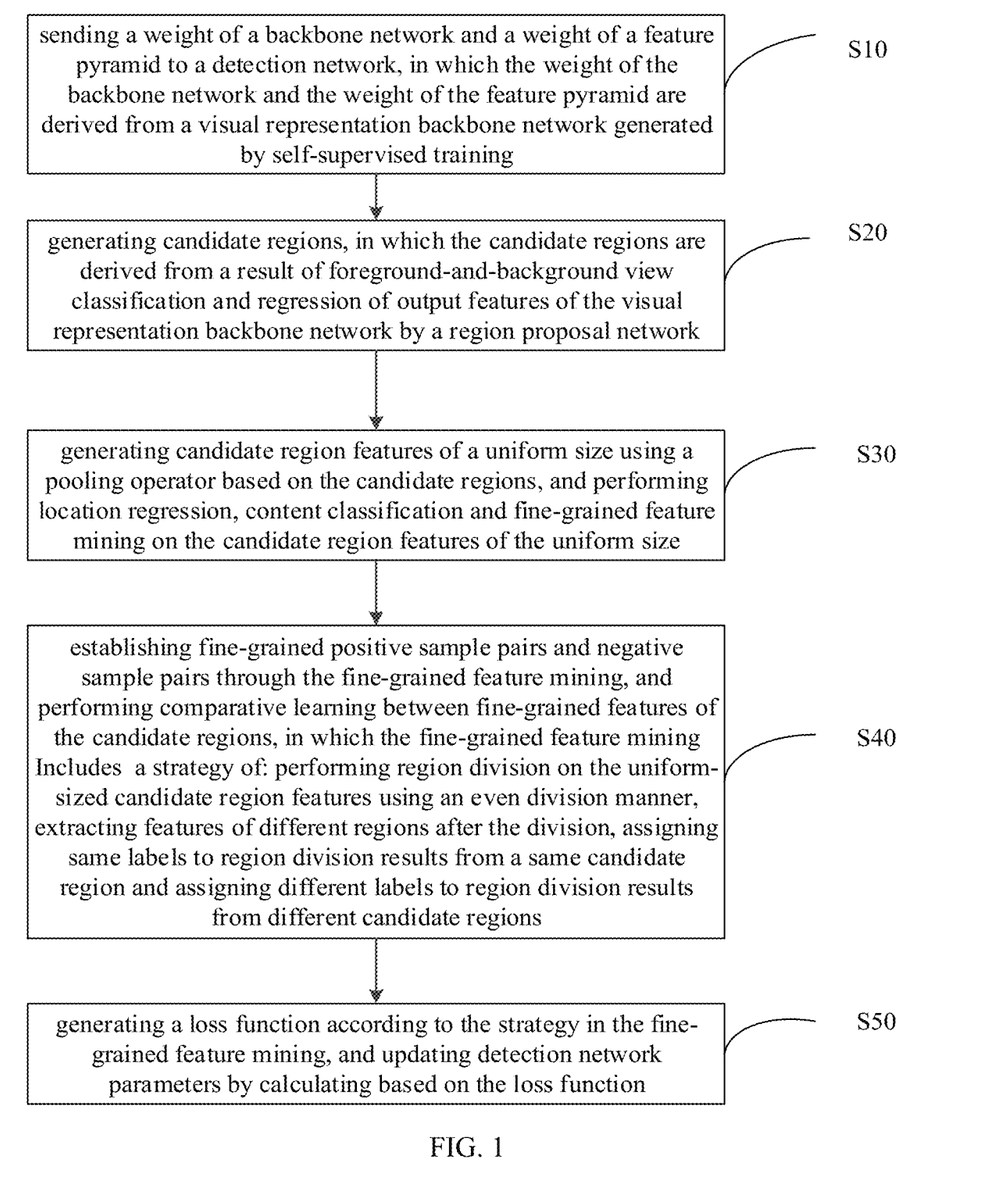
FIG. 1 a flowchart of a few-shot object detection method according to an embodiment of the disclosure.

FIG. 1 a flowchart of a few-shot object detection method according to an embodiment of the disclosure.

As shown in FIG. 1, the few-shot object detection method includes the following steps S10 to S50.

At step S10, a weight of a backbone network and a weight of a feature pyramid are sent to a detection network, in which the weight of the backbone network and the weight of the feature pyramid are derived from a visual representation backbone network generated by self-supervised training.

It should be noted that in an embodiment of the disclosure, weights of the ResNet-series backbone networks used for self-supervised training can be fully transferred to a basic detection network, such as a Faster R-CNN, a Cascade R-CNN, etc.

Figure 2:
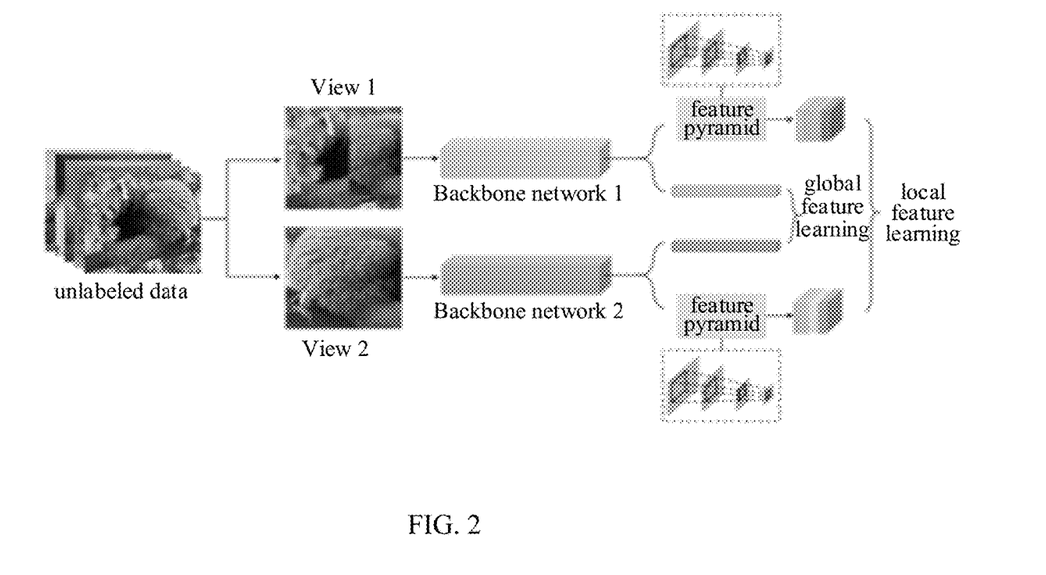
FIG. 2 is a schematic diagram of an overall process of a self-supervised training according to an embodiment of the disclosure.

In an embodiment of the disclosure, generating the visual representation backbone network by the self-supervised training includes:
obtaining unlabeled original image data, the original image data being derived from an output result of an image acquisition device;
obtaining image data of a plurality of views by performing different data enhancements on the original image data respectively; and
inputting the image data of each of the plurality of views respectively into a plurality of backbone networks respectively to perform contrastive learning between features of different granularities, and generating the visual representation backbone network through contrastive learning of global features and local features.

In an embodiment of the disclosure, inputting the image data of each of the plurality of views respectively into the plurality of backbone networks respectively to perform the contrastive learning between features of different granularities and generating the visual representation backbone network through the contrastive learning of global features and local features, includes:
generating pseudo labels of unsupervised data, including: inputting the corresponding views generated by performing the different data enhancements on the unlabeled original image data into the plurality of backbone networks respectively, assigning the same pseudo labels to views derived from the same unlabeled original image data through feature extraction of the plurality of backbone networks, and assigning different pseudo labels to views derived from different unlabeled data through the feature extraction of the plurality of backbone networks;
pre-training the fine-grained features, including: uniformly outputting the pseudo labels of the unsupervised data with different feature granularities presented at different levels of the feature pyramid by pooling; and
generating the visual representation backbone network, including: performing contrastive learning by uniting the global features and the local features, updating model parameters using a loss function of the contrastive learning to generate a backbone network with a capability of representing different scales of objects.

In an embodiment of the disclosure, the loss function uses InfoNCE (information noise contrastive estimation), an overall loss is derived from global feature learning and local feature learning, and an equation of the loss function is as follows:

$$\mathcal{L}_{total} = L_{global} + L_{local} = -\log\frac{\exp(q_g \cdot k_{g+}/\tau)}{\sum_{i=0}^{K}\exp(q_g \cdot k_{gi}/\tau)} - \log\frac{\exp(q_l \cdot k_{l+}/\tau)}{\sum_{i=0}^{K}\exp(q_l \cdot k_{li}/\tau)},$$

where, K represents a total number of plurality of views, $q_g$ represents a first global feature learning result, $k_{g+}$ represents a second global feature learning result, $k_{gi}$ represents a third global feature learning result, $q_l$, $k_{l+}$ and $k_{li}$ represent corresponding local feature learning results, $\tau$ represents a hyper-parameter, and $L_{total}$ represents the overall loss, $L_{global}$ represents a loss of the global feature learning, and $L_{local}$ represents a loss of the local learning.

Further, in an embodiment of the disclosure, the first global feature learning result is a global feature learning result obtained by encoding view 1 with the backbone network 1 in FIG. 2, and the second global feature learning result is a global feature learning result obtained by encoding view 2 with the backbone network 2 in FIG. 2. View 1 and view 2 are generated from the same original image. The third global feature learning result is a global feature learning result obtained by encoding view 3 (not shown in FIG. 2) with the backbone network 2 in FIG. 2. View 3 is generated from an original image that is different from the original image for generating view 1 and view 2.

In an embodiment of the disclosure, the plurality of backbone networks include:
a first backbone network, configured to perform parameter update through back propagation; and
a second backbone network, configured to perform parameter update through momentum update by removing gradients of all parameters.

It should be noted that in an embodiment of the disclosure, the plurality of backbone networks generally use ResNet. The contrastive learning that unites the global features and the local features includes picture-level contrastive learning using the same way as MoCo v2.

Figure 3:
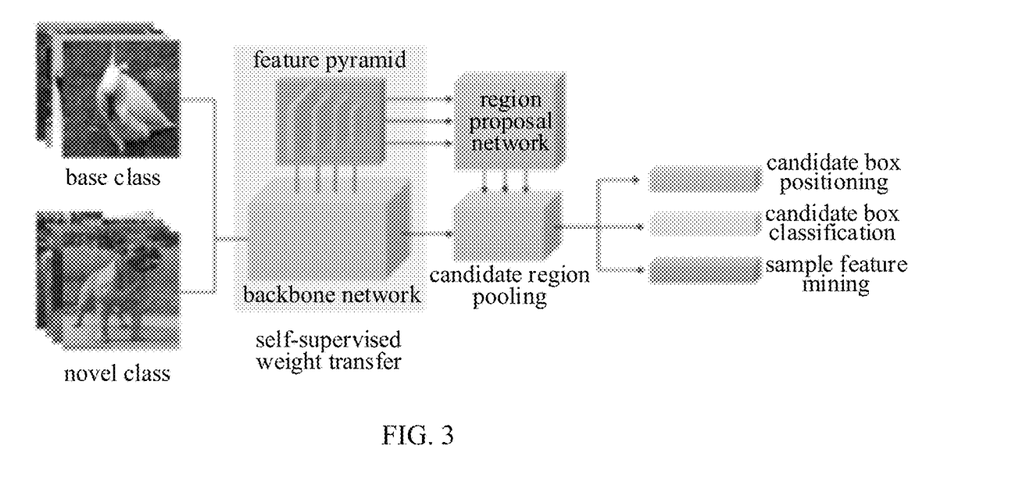
FIG. 3 is a schematic diagram of an overall process of few-shot object detection according to an embodiment of the disclosure.

In addition, FIG. 3 is a schematic diagram of a few-shot object detection overall process according to an embodiment of the disclosure. This figure follows the transfer learning-based few-shot detection framework, in which a base class represents a class containing sufficient labeled data, and the novel class represents a detection scenario containing only a small number of labeled samples. The model guides to transfer knowledge from the base class to the novel class through transfer learning after training based on the data of the base class, thereby achieving better model performance under the condition of fewer samples.

At step S20, candidate regions are generated, in which the candidate regions are derived from a result of foreground-and-background view classification and regression of output features of the visual representation backbone network by a region proposal network.

In an embodiment of the disclosure, generating the candidate regions, includes: embedding the feature pyramid network into the backbone network as a component of the detection network, for extracting image features of different granularities to generate the candidate regions.

In an embodiment of the disclosure, candidate regions ranging in size from 32×32 to 512×512 are extracted and generated separately, to facilitate location regression for objects of different sizes.

At step S30, candidate region features of a uniform size are generated using a pooling operator based on the candidate regions, and location regression, content classification and fine-grained feature mining are performed on the candidate region features of the uniform size.

In an embodiment of the disclosure, the pooling operator may include:

ROI Pooling; and

ROI Align.

At step S40, fine-grained positive sample pairs and negative sample pairs are established through the fine-grained feature mining, and comparative learning between fine-grained features of the candidate regions is performed, in which the fine-grained feature mining includes a strategy of: performing region division on the uniform-sized candidate region features using an even division manner, extracting features of different regions after the division, assigning same labels to region division results from a same candidate region and assigning different labels to region division results from different candidate regions.

Figure 4:
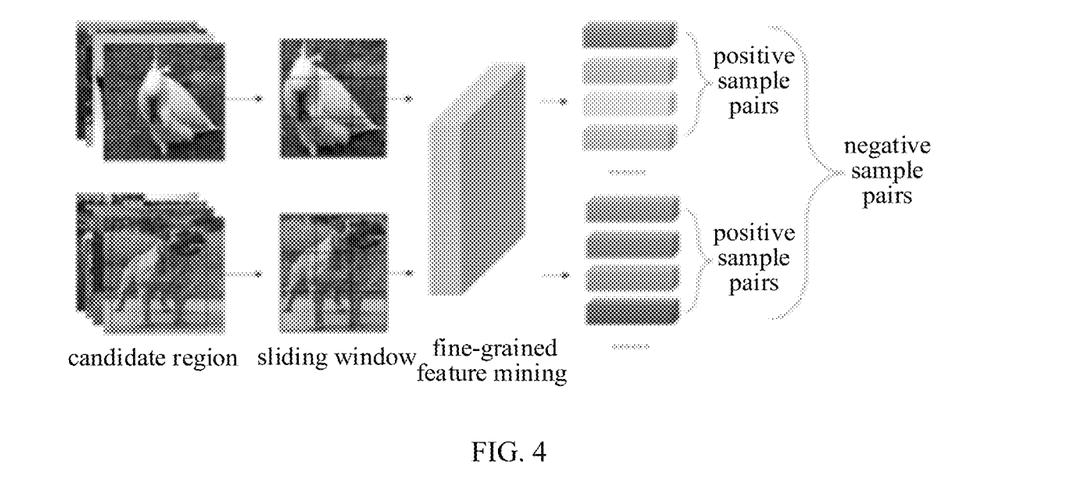
FIG. 4 is a schematic diagram of an intra-sample feature mining learning approach according to an embodiment of the disclosure.

In an embodiment of the disclosure, a fine-grained feature representation about part of an instance is formed by extracting features from different regions, which have a final dimension of 128.

As shown in FIG. 4, the disclosure provides an in-sample feature mining learning head and an inter-sample feature mining learning head. The in-sample feature mining learning head performs window sliding for an input sample feature, generates refined features at different positions of each candidate box, and mines finer sample features by assigning pseudo labels and performing contrastive learning, to provide finer information for the classification of candidate boxes.

At step S50, a loss function is generated according to the strategy in the fine-grained feature mining, and detection network parameters are updated by calculating based on the loss function.

In an embodiment of the disclosure, the loss function may include:

three loss functions contained in the few-shot object detection method, i.e., a class loss function $L_{cls}$, a bounding-box regression loss function $L_{bbox}$, and a sample feature mining loss function $L_{feat}$, and an overall loss being a mixture of the three loss functions in equal proportions according to the following equation:

$$\mathcal{L}_{total} = \mathcal{L}_{cls} + \mathcal{L}_{bbox} + \mathcal{L}_{feat}.$$

In conclusion, the disclosure provides a few-shot object detection method. The disclosure proposes to use self-supervised pre-training instead of supervised pre-training. The pre-training with feature focus oriented to intra-instance can mine the fine-grained intra-sample features, thereby effectively reserve spatial information. The spatial feature focus oriented to inter-instance can expand the distance between data of different classes, thereby improving the accuracy of class information representation within the feature space.

Figure 5:
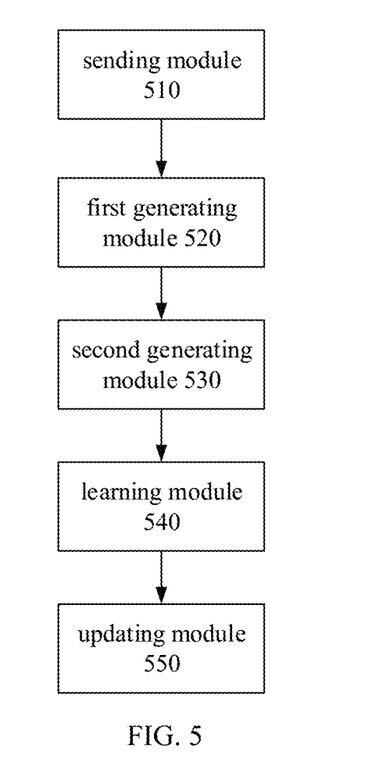
FIG. 5 is a block diagram of a few-shot object detection apparatus according to an embodiment of the disclosure.

FIG. 5 is a schematic diagram of the structure of a few-shot object detection apparatus according to an embodiment of the disclosure.

As shown in FIG. 5, the few-shot object detection apparatus includes: a sending module 510, a first generating module 520, a second generating module 530, a learning module 540, and an updating module 550.

The sending module 510 is configured to send a weight of a backbone network and a weight of a feature pyramid to a base detection network, in which the weight of the backbone network and the weight of the feature pyramid are derived from a visual representation backbone network generated by self-supervised training.

The first generating module 520 is configured to generate candidate regions, in which the candidate regions are derived from a result of foreground-and-background view classification and regression of output features of the visual representation backbone network by a region proposal network.

The second generating module 530 is configured to generate candidate region features of a uniform size using a pooling operator based on the candidate regions, and perform location regression, content classification and fine-grained feature mining on the candidate region features of the uniform size.

The learning module 540 is configured to establish fine-grained positive sample pairs and negative sample pairs through the fine-grained feature mining, and perform comparative learning between fine-grained features of the candidate regions, in which the fine-grained feature mining includes a strategy of: performing region division on the uniform-sized candidate region features using an even division manner, extracting features of different regions after the division, assigning same labels to region division results from a same candidate region and assigning different labels to region division results from different candidate regions.

The updating module 550 is configured to generate a loss function according to the strategy in the fine-grained feature mining, and update detection network parameters by calculating based on the loss function.

In some embodiments, the first generating module 520 is configured to: embed the feature pyramid network into the backbone network as a component of the detection network, for extracting image features of different granularities to generate the candidate regions.

Regarding the apparatus in the above embodiments, the specific way in which each module performs its operation has been described in detail in the embodiments concerning the method, and will not be described in detail here.

In conclusion, the disclosure provides a few-shot object detection apparatus, which proposes to use self-supervised pre-training instead of supervised pre-training, designs a learning task that combines the global features and the local features, and adds a sample feature mining learning module to provide richer features for few-shot learning. Through the intra-sample feature mining as well as inter-sample feature mining, the focus on fine-grained features of intra-class samples, the ability to represent classes in the feature space, and the model detection accuracy can be improved.

To achieve the above purpose, the third aspect of the embodiments of the disclosure provides a computer device. The computer device includes: a memory, a processor and computer programs stored on the memory and executable on the processor. When the computer programs are executed by the processor, the few-shot object detection method described according to the first aspect of the embodiments of the disclosure is implemented.

To achieve the above purpose, the fourth aspect of the embodiments of the disclosure provides a non-transitory computer-readable storage medium having computer programs stored thereon. When the computer programs are executed by a processor, the few-shot object detection method described according to the first aspect of the embodiments of the disclosure is implemented.

To achieve the above purpose, the fifth aspect of the embodiments of the disclosure provides a computer program product, including computer programs or instructions. When the computer programs or instructions are executed by a processor, the few-shot object detection method described according to the first aspect of the embodiments of the disclosure is implemented.

In conclusion, the disclosure provides a few-shot object detection method, a few-shot object detection apparatus, a computer device, and a non-transitory computer readable storage medium. A sample feature mining learning module can be added to provide richer features for few-shot learning. Through intra-sample feature mining as well as inter-sample feature mining, the focus on fine-grained features of intra-class samples, the ability to represent classes in the feature space, and the model detection accuracy can be improved.

Reference throughout this specification to "an embodiment," "some embodiments," "an example," "a specific example," or "some examples," means that a particular feature, structure, material, or characteristic described in combination with the embodiment or example is included in at least one embodiment or example of the disclosure. The schematic representations of the above terms in this specification are not necessarily referring to the same embodiment or example of the disclosure. Furthermore, the particular feature, structure, material, or characteristic described may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or implicitly specify the number of technical features indicated. Therefore, features limited to "first" and "second" may explicitly or implicitly include at least one such feature. In the description of the disclosure, "a plurality of" means at least two, for example, two or three, unless specified otherwise.

Any process or method described in a flowchart or described herein in other ways may be understood to include one or more modules, segments or portions of codes of executable instructions for achieving specific logical functions or steps in the process, and the scope of a preferred embodiment of the disclosure includes other implementations, which may be performed an order different from the order shown or discussed, including performing functions in a substantially simultaneous manner or in a reverse order, depending on the functions involved, as should be understood by those skilled in the art to which embodiments of the disclosure belong.

The logic and/or step described in other manners herein or shown in the flowchart, for example, a particular sequence table of executable instructions for realizing a logical function, may be specifically implemented in any computer readable medium to be used by an instruction execution system, device or equipment (such as a system based on computers, a system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (a non-exhaustive list) of the computer readable medium include but are not limited to: an electronic connection (an electronic device) with one or more wires, a portable computer enclosure (a magnetic device), a Random Access Memory (RAM), a Read Only Memory (ROM), an Erasable Programmable Read-Only Memory (EPROM or a flash memory), an optical fiber device and a portable Compact Disk Read-Only Memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a Programmable Gate Array (PGA), a Field Programmable Gate Array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be ROMs, magnetic disks or CDs, etc. Although explanatory embodiments have been shown and described, it would be appreciated that the above embodiments cannot be construed to limit the disclosure, and changes, alternatives, and modifications can be made by those skilled in the art without departing from scope of the disclosure.

What is claimed is:

1. A few-shot object detection method, comprising:
    sending a weight of a backbone network and a weight of a feature pyramid to a detection network, wherein the weight of the backbone network and the weight of the feature pyramid are derived from a visual representation backbone network generated by self-supervised training;
    generating candidate regions, wherein the candidate regions are derived from a result of foreground-and-background view classification and regression of output features of the visual representation backbone network by a region proposal network;
    generating candidate region features of a uniform size using a pooling operator based on the candidate regions, and performing location regression, content classification and fine-grained feature mining on the candidate region features of the uniform size;
    establishing fine-grained positive sample pairs and negative sample pairs through the fine-grained feature mining, and performing comparative learning between fine-grained features of the candidate regions, wherein the fine-grained feature mining comprises a strategy of: performing region division on the uniform-sized candidate region features using an even division manner, extracting features of different regions after the division, assigning same labels to region division results from a same candidate region and assigning different labels to region division results from different candidate regions; and
    generating a loss function according to the strategy in the fine-grained feature mining, and updating detection network parameters by calculating based on the loss function.

2. The method of claim 1, wherein generating the visual representation backbone network by the self-supervised training comprises:
    obtaining unlabeled original image data, the original image data being derived from an output result of an image acquisition device;
    obtaining image data of a plurality of views by performing different data enhancements on the original image data respectively; and
    inputting the image data of each of the plurality of views respectively into a plurality of backbone networks respectively to perform contrastive learning between features of different granularities, and generating the visual representation backbone network through contrastive learning of global features and local features.

3. The method of claim 2, wherein inputting the image data of each of the plurality of views respectively into the plurality of backbone networks respectively to perform the contrastive learning between features of different granularities and generating the visual representation backbone network through contrastive learning of global features and local features comprises:
    generating pseudo labels of unsupervised data, comprising: inputting the corresponding views generated by performing the different data enhancements on the unlabeled original image data into the plurality of backbone networks respectively, assigning same pseudo labels to views derived from the same unlabeled original image data through feature extraction of the plurality of backbone networks, and assigning different pseudo labels to views derived from different unlabeled data through the feature extraction of the plurality of backbone networks;
    pre-training the fine-grained features, comprising: uniformly outputting the pseudo labels of the unsupervised data with different feature granularities presented at different levels of the feature pyramid by pooling; and
    generating the visual representation backbone network, wherein generating the visual representation backbone network comprises: performing contrastive learning by uniting the global features and the local features, updating model parameters using a loss function of the contrastive learning to generate a backbone network with a capability of representing different scales of objects.

4. The method of claim 2, wherein the plurality of backbone networks comprise:
    a first backbone network, configured to perform parameter update through back propagation; and
    a second backbone network, configured to perform parameter update through momentum update by removing gradients of all parameters.

5. The method of claim 1, wherein the loss function comprises:
    a loss function using InfoNCE (information noise contrastive estimation), an overall loss being derived from global feature learning and local feature learning, and an equation of the loss function being as follows:

$$\mathcal{L}_{total} = L_{global} + L_{local} = -\log \frac{\exp(q_g \cdot k_{g+}/\tau)}{\sum_{i=0}^{K} \exp(q_g \cdot k_{gi}/\tau)} - \log \frac{\exp(q_l \cdot k_{l+}/\tau)}{\sum_{i=0}^{K} \exp(q_l \cdot k_{li}/\tau)},$$

where, K represents a total number of plurality of views, $q_g$ represents a first global feature learning result, $k_{g+}$ represents a second global feature learning result, $k_{gi}$ represents a third global feature learning result, $q_l$, $k_{l+}$ and $k_{li}$ represent corresponding local feature learning results, $\tau$ represents a hyper-parameter, and $L_{total}$ represents an overall loss, $L_{global}$ represents a loss of the global feature learning, and $L_{local}$ represents a loss of the local learning; or, three loss functions contained in the few-shot object detection method, wherein the three loss functions comprise: a class loss function $L_{cls}$, a bounding-box regression loss function $L_{bbox}$, and a sample feature mining loss function $L_{feat}$, and an overall loss being a mixture of the three loss functions in equal proportions according to the following equation:

$$\mathcal{L}_{total} = \mathcal{L}_{cls} + \mathcal{L}_{bbox} + \mathcal{L}_{feat}.$$

6. The method of claim 1, wherein generating the candidate regions comprises:
embedding the feature pyramid into the backbone network as a component of the detection network, for extracting image features of different granularities to generate the candidate regions.

7. A computer device, comprising a memory, a processor and computer programs stored on the memory and executable on the processor, wherein when the computer programs are executed by the processor, a few-shot object detection method is implemented, the method comprising:
sending a weight of a backbone network and a weight of a feature pyramid to a detection network, wherein the weight of the backbone network and the weight of the feature pyramid are derived from a visual representation backbone network generated by self-supervised training;
generating candidate regions, wherein the candidate regions are derived from a result of foreground-and-background view classification and regression of output features of the visual representation backbone network by a region proposal network;
generating candidate region features of a uniform size using a pooling operator based on the candidate regions, and performing location regression, content classification and fine-grained feature mining on the candidate region features of the uniform size;
establishing fine-grained positive sample pairs and negative sample pairs through the fine-grained feature mining, and performing comparative learning between fine-grained features of the candidate regions, wherein the fine-grained feature mining comprises a strategy of: performing region division on the uniform-sized candidate region features using an even division manner, extracting features of different regions after the division, assigning same labels to region division results from a same candidate region and assigning different labels to region division results from different candidate regions; and
generating a loss function according to the strategy in the fine-grained feature mining, and updating detection network parameters by calculating based on the loss function.

8. The computer device of claim 7, wherein generating the visual representation backbone network by the self-supervised training comprises:
obtaining unlabeled original image data, the original image data being derived from an output result of an image acquisition device;
obtaining image data of a plurality of views by performing different data enhancements on the original image data respectively; and
inputting the image data of each of the plurality of views respectively into a plurality of backbone networks respectively to perform contrastive learning between features of different granularities, and generating the visual representation backbone network through contrastive learning of global features and local features.

9. The computer device of claim 8, wherein inputting the image data of each of the plurality of views respectively into the plurality of backbone networks respectively to perform the contrastive learning between features of different granularities and generating the visual representation backbone network through contrastive learning of global features and local features comprises:
generating pseudo labels of unsupervised data, comprising: inputting the corresponding views generated by performing the different data enhancements on the unlabeled original image data into the plurality of backbone networks respectively, assigning same pseudo labels to views derived from the same unlabeled original image data through feature extraction of the plurality of backbone networks, and assigning different pseudo labels to views derived from different unlabeled data through the feature extraction of the plurality of backbone networks;
pre-training the fine-grained features, comprising: uniformly outputting the pseudo labels of the unsupervised data with different feature granularities presented at different levels of the feature pyramid by pooling; and
generating the visual representation backbone network, wherein generating the visual representation backbone network comprises: performing contrastive learning by uniting the global features and the local features, updating model parameters using a loss function of the contrastive learning to generate a backbone network with a capability of representing different scales of objects.

10. The computer device of claim 8, wherein the plurality of backbone networks comprise:
a first backbone network, configured to perform parameter update through back propagation; and
a second backbone network, configured to perform parameter update through momentum update by removing gradients of all parameters.

11. The computer device of claim 7, wherein the loss function comprises:
a loss function using InfoNCE (information noise contrastive estimation), an overall loss being derived from global feature learning and local feature learning, and an equation of the loss function being as follows:

$$\mathcal{L}_{total} = L_{global} + L_{local} = -\log \frac{\exp(q_g \cdot k_{g+}/\tau)}{\sum_{i=0}^{K} \exp(q_g \cdot k_{g_i}/\tau)} - \log \frac{\exp(q_l \cdot k_{l+}/\tau)}{\sum_{i=0}^{K} \exp(q_l \cdot k_{l_i}/\tau)},$$

where, K represents a total number of plurality of views, $q_g$ represents a first global feature learning result, $k_{g+}$ represents a second global feature learning result, $k_{gi}$ represents a third global feature learning result, $q_l$, $k_{l+}$ and $k_{li}$ represent corresponding local feature learning results, $\tau$ represents a hyper-parameter, and $L_{total}$ represents an overall loss, $L_{global}$ represents a loss of the global feature learning, and $L_{local}$ represents a loss of the local learning; or,
three loss functions contained in the few-shot object detection method, wherein the three loss functions comprise: a class loss function $L_{cls}$, a bounding-box regression loss function $L_{bbox}$, and a sample feature mining loss function $L_{feat}$, and an overall loss being a mixture of the three loss functions in equal proportions according to the following equation:

$$\mathcal{L}_{total} = \mathcal{L}_{cls} + \mathcal{L}_{bbox} + \mathcal{L}_{feat}.$$

12. The computer device of claim 7, wherein generating the candidate regions comprises:
embedding the feature pyramid into the backbone network as a component of the detection network, for extracting image features of different granularities to generate the candidate regions.

13. A non-transitory computer-readable storage medium having computer programs stored thereon, wherein when the computer programs are executed by a processor, a few-shot object detection method is implemented, the method comprising:
sending a weight of a backbone network and a weight of a feature pyramid to a detection network, wherein the weight of the backbone network and the weight of the feature pyramid are derived from a visual representation backbone network generated by self-supervised training;
generating candidate regions, wherein the candidate regions are derived from a result of foreground-and-background view classification and regression of output features of the visual representation backbone network by a region proposal network;
generating candidate region features of a uniform size using a pooling operator based on the candidate regions, and performing location regression, content classification and fine-grained feature mining on the candidate region features of the uniform size;
establishing fine-grained positive sample pairs and negative sample pairs through the fine-grained feature mining, and performing comparative learning between fine-grained features of the candidate regions, wherein the fine-grained feature mining comprises a strategy of: performing region division on the uniform-sized candidate region features using an even division manner, extracting features of different regions after the division, assigning same labels to region division results from a same candidate region and assigning different labels to region division results from different candidate regions; and
generating a loss function according to the strategy in the fine-grained feature mining, and updating detection network parameters by calculating based on the loss function.

14. The non-transitory computer-readable storage medium of claim 13, wherein generating the visual representation backbone network by the self-supervised training comprises:
obtaining unlabeled original image data, the original image data being derived from an output result of an image acquisition device;
obtaining image data of a plurality of views by performing different data enhancements on the original image data respectively; and
inputting the image data of each of the plurality of views respectively into a plurality of backbone networks respectively to perform contrastive learning between features of different granularities, and generating the visual representation backbone network through contrastive learning of global features and local features.

15. The non-transitory computer-readable storage medium of claim 14, wherein inputting the image data of each of the plurality of views respectively into the plurality of backbone networks respectively to perform the contrastive learning between features of different granularities and generating the visual representation backbone network through contrastive learning of global features and local features comprises:
generating pseudo labels of unsupervised data, comprising: inputting the corresponding views generated by performing the different data enhancements on the unlabeled original image data into the plurality of backbone networks respectively, assigning same pseudo labels to views derived from the same unlabeled original image data through feature extraction of the plurality of backbone networks, and assigning different pseudo labels to views derived from different unlabeled data through the feature extraction of the plurality of backbone networks;
pre-training the fine-grained features, comprising: uniformly outputting the pseudo labels of the unsupervised data with different feature granularities presented at different levels of the feature pyramid by pooling; and
generating the visual representation backbone network, wherein generating the visual representation backbone network comprises: performing contrastive learning by uniting the global features and the local features, updating model parameters using a loss function of the contrastive learning to generate a backbone network with a capability of representing different scales of objects.

16. The non-transitory computer-readable storage medium of claim 14, wherein the plurality of backbone networks comprise:
a first backbone network, configured to perform parameter update through back propagation; and
a second backbone network, configured to perform parameter update through momentum update by removing gradients of all parameters.

17. The non-transitory computer-readable storage medium of claim 13, wherein the loss function comprises:
a loss function using InfoNCE (information noise contrastive estimation), an overall loss being derived from global feature learning and local feature learning, and an equation of the loss function being as follows:

$$\mathcal{L}_{total} = L_{global} + L_{local} = -\log\frac{\exp(q_g \cdot k_{g+}/\tau)}{\sum_{i=0}^{K}\exp(q_g \cdot k_{gi}/\tau)} - \log\frac{\exp(q_l \cdot k_{l+}/\tau)}{\sum_{i=0}^{K}\exp(q_l \cdot k_{li}/\tau)},$$

where, K represents a total number of plurality of views, $q_g$ represents a first global feature learning result, $k_{g+}$ represents a second global feature learning result, $k_{gi}$ represents a third global feature learning result, $q_l$, $k_{l+}$ and $k_{li}$ represent corresponding local feature learning results, $\tau$ represents a hyper-parameter, and $L_{total}$ represents an overall loss, $L_{global}$ represents a loss of the global feature learning, and $L_{local}$ represents a loss of the local learning; or,
three loss functions contained in the few-shot object detection method, wherein the three loss functions comprise: a class loss function $L_{cls}$, a bounding-box regression loss function $L_{bbox}$, and a sample feature mining loss function $L_{feat}$, and an overall loss being a mixture of the three loss functions in equal proportions according to the following equation:

$$\mathcal{L}_{total} = \mathcal{L}_{cls} + \mathcal{L}_{bbox} + \mathcal{L}_{feat}.$$

18. The non-transitory computer-readable storage medium of claim 13, wherein generating the candidate regions comprises:
  embedding the feature pyramid into the backbone network as a component of the detection network, for extracting image features of different granularities to generate the candidate regions.

* * * * *